Figure 1:
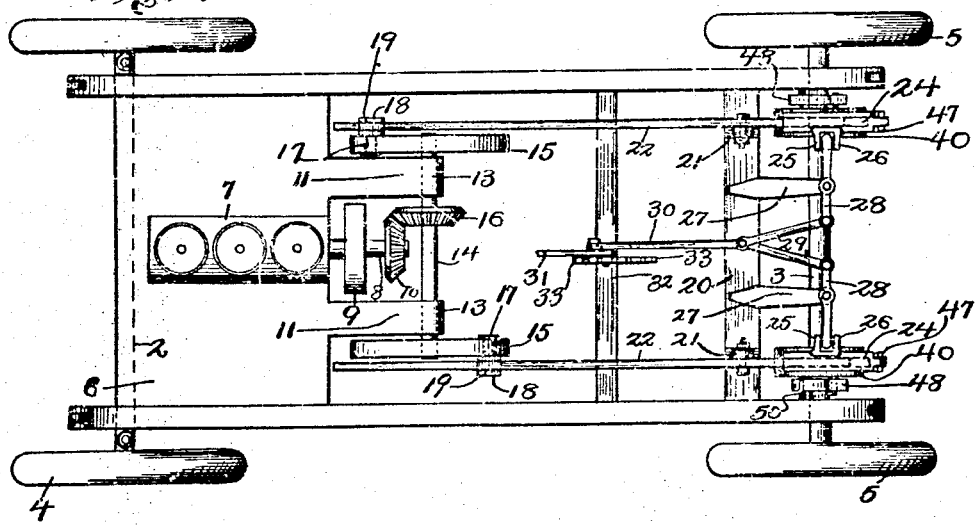

No. 872,999. PATENTED DEC. 3, 1907.
G. MALBURG.
POWER TRANSMITTING MECHANISM.
APPLICATION FILED DEC. 24, 1904.

WITNESSES:
Daniel E. Daly.
Victor C. Lynch.

INVENTOR
Gottfried Malburg
BY
Lynch & Dorr.
ATTORNEYS

UNITED STATES PATENT OFFICE.

GOTTFRIED MALBURG, OF CLEVELAND, OHIO, ASSIGNOR OF THREE-FOURTHS TO A. A. MARESH, R. J. MacKENZIE, THEO. HANKS, FRANK McHALE, AND FRED MATHEWS, OF CLEVELAND, OHIO.

POWER-TRANSMITTING MECHANISM.

No. 872,999.        Specification of Letters Patent.        Patented Dec. 3, 1907.

Application filed December 24, 1904. Serial No. 238,204.

*To all whom it may concern:*

Be it known that I, GOTTFRIED MALBURG, a citizen of the United States of America, residing at Cleveland, in the county of Cuyahoga and State of Ohio, have invented certain new and useful Improvements in Power-Transmitting Mechanism; and I hereby declare the following to be a full, clear, and exact description of the invention, such as will enable others skilled in the art to which it pertains to make and use the same.

This invention relates to improvements in self-propelled vehicles, and especially to power transmitting mechanism therefor.

The object of this invention is to provide means for utilizing the energy of an explosive engine or other rapidly operating engine in an economical manner and with the highest efficiency.

My invention, therefore, consists in providing new and improved means for coupling the engine with the driving wheels of the car.

My invention also consists in the features of construction and combination of parts as described in the specification, pointed out in the claims and illustrated in the drawings.

Figure 2:
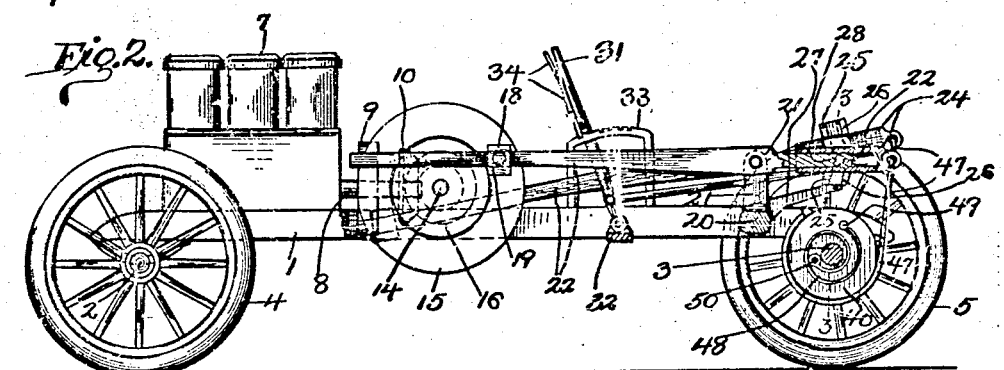
Figures 3, 4:
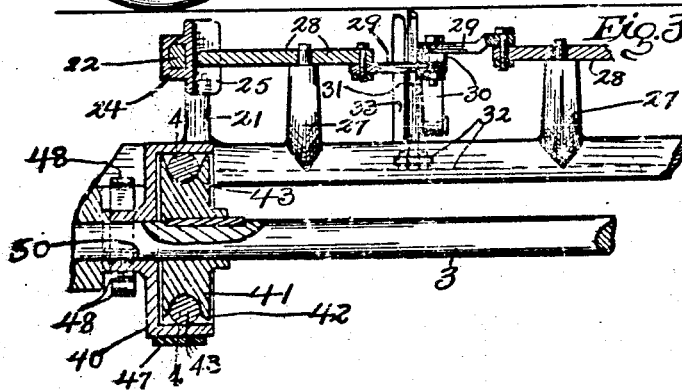

In the accompanying drawings, Figure 1 shows a top plan of a car embodying my invention with the body portion of the car removed. Fig. 2 is a side elevation of same with part broken away and portions in section. Fig. 3 is a section on line 3—3, Fig. 2. Fig. 4 is a section on line 4—4, Fig. 3.

Again referring to the drawings, 1 represents the frame of the running gear. In this frame are mounted, in the usual manner, front and rear axles, 2 and 3 respectively. On the front axle are mounted traction wheels 4, and on the rear axle are mounted traction wheels 5. On the front part of the frame 1 is arranged a platform 6, on which is mounted an engine 7, of the usual construction. The engine 7 is provided with the usual engine shaft 8 on which is rigidly secured a balance wheel 9 and a gear wheel 10. Supports 11 are arranged to extend back from the platform 6, and on these supports are formed bearings 13 for a shaft 14. On each end of the shaft 14 is rigidly secured a wheel 15. A gear wheel 16 is also secured on the shaft 14 and is arranged to mesh with the gear wheel 10 on the engine shaft 7. On each wheel 15 is rotatably secured a crank pin 17, which has an enlarged head or box 18, preferably, formed integral therewith. In this head or box is formed an opening 19 which extends through from side to side. A support 20 is secured in the frame 1, and on this support are mounted two standards 21. On each of the standards 21 is pivotally mounted a lever 22 at a point between its ends so that the said standards form fulcrums for the said levers. One end of each lever 22 extends into and is arranged to slide freely in the box 18 on the wheel 15 adjacent thereto. On the other end of each of the levers 22 is arranged a sliding extension or sleeve 24, and on the sides of each of the said extensions 24 are arranged curved lugs 25 and 26. On the support 20 are mounted two brackets 27, on each of which is pivotally mounted an arm 28. One end of each arm 28 extends between the lugs 25 and 26 on the extension 24 adjacent thereto, and to the opposite end thereof is secured a link 29. The links 29 are in turn pivotally secured to a rod 30, which is pivotally connected with a hand lever 31, fulcrumed on a support 32 secured in frame 1. Locking means of the usual construction are provided for holding the hand lever 31 in any position in which it is placed, and this locking means comprises a serrated sector-shaped plate 33, which is rigidly secured to the support 32. A spring controlled latch 34 is slidably mounted on the hand lever 31, and is arranged to engage with the teeth on the plate 33.

On the axle 3 are rotatably mounted two drums 40. Within the flange of each drum 40 is arranged a clutch disk 41, which is keyed to the axle 3. In the perimeter of each disk 41 are formed a series of pockets 42, the sides of which are inclined and converge at the bottom. In each pocket 42 is arranged a ball 43, the diameter of which is such that when said ball is in the deepest part of the pocket, it will not come in contact with the flange of the drum. In the wall of each pocket is formed a socket 44 in which is arranged a coil spring 45, the tendency of which is to force the ball out of the deepest part of the pocket. The operation of this clutch is as follows:—When the drum is rotated in one direction, that is to the right as shown in the drawings, the balls will move towards and remain in the deepest part of the respective pockets, but when the drum is turned in the opposite direction, that is towards the left, the balls will be forced into the more shallow parts of the respective pockets, and will consequently wedge between the drum and the disk, thereby locking the drum to the disk and consequently preventing the drum from turning on the axle 3. A cable 47 of sufficient length to allow a partial turn around the drum is secured at one end to each drum 40, and the other end is secured to the outer end of the extension 24 on the end of the adjacent lever 22. A coil spring 48 is secured to each drum 40 by means of a pin 49, and to the frame of the machine by means of a pin 50.

The operation of my improved power transmitting mechanism is as follows:—When the engine is started, the wheels 15 are caused to rotate through their operative connection with the engine, and as they rotate they impart a vertical reciprocating motion to the levers 22. As the forward end of the lever moves down, the rear end moves up drawing the cable from the drum, and thereby causing a rotation of said drum, and as soon as the drum begins to move in the direction it is rotated by the movement of the lever, it is locked to the axle by means of the clutch. When the forward end of the lever moves up, then the rear end will move down and the spring which is secured to the drum will cause a rotation of the drum in the opposite direction to that in which it was rotated by the movement of the lever, and the cable will be again wound on the drum. If it is desired to decrease the speed of the machine, the hand lever is pulled backwards which shoves back the rod 30 and the links 29, thereby causing the ends of the arms 28 which are connected with said links to swing back, while the other ends of said arms which extend between the curved lugs on the extension 24 are caused to swing forward shoving the extension up on the ends of the levers 22 thereby decreasing the length of said levers and correspondingly decreasing the speed of the machine. Likewise if it is desired to increase the speed of the machine, the hand lever is moved forward, increasing the length of said levers 22 and causing a corresponding increase in the speed of the machine. The curvature of the lugs 25 and 26 permit the ends of the arms 28 to remain in operative connection with the extension 24 at all times.

What I claim is:

Power transmitting mechanism comprising, the combination of a frame, an engine mounted on said frame, a gear wheel secured on the engine shaft, a shaft arranged at a right-angle to the engine shaft, a gear wheel mounted on said last-mentioned shaft and arranged to mesh with the gear wheel on the engine shaft, two wheels rigidly secured on said last-mentioned shaft, boxes rotatably mounted on said wheels, levers fulcrumed in said frame and having their ends extending into and arranged to slide freely in the respective boxes, sleeves arranged on the opposite ends of said levers, means for sliding said sleeves in and out on same, means for locking said sleeves in their adjusted positions, a driving shaft, drums mounted on said driving shaft, a cable connecting each drum with one of said levers so that the movement of said levers in one direction will cause a rotary movement of said drums in one direction, automatically operating clutches arranged to lock said drums to said driving shaft when said drums are rotated by the movements of said levers, and springs for rotating said drums in the opposite direction to that in which they were rotated by said levers, substantially as described and for the purpose set forth.

In testimony whereof, I sign the foregoing specification, in the presence of two witnesses.

GOTTFRIED MALBURG.

Witnesses:
VICTOR C. LYNCH,
N. L. MCDONNELL.